United States Patent [19]

Patti

[11] Patent Number: 4,725,100
[45] Date of Patent: Feb. 16, 1988

[54] VEHICLE WHEEL COVER ASSEMBLY AND ATTACHMENT

[75] Inventor: Anthony J. Patti, Hayward, Calif.

[73] Assignee: Wheel Masters, Inc., San Leandro, Calif.

[21] Appl. No.: 871,363

[22] Filed: Jun. 6, 1986

[51] Int. Cl.[4] .................... B62D 25/16; B60B 7/06
[52] U.S. Cl. ......................... 301/37 CD; 301/37 H; 301/37 R; 411/174
[58] Field of Search ............ 301/37 R, 37 C, 37 CD, 301/37 TP, 37 S, 37 H, 9 DN, 108 R, 108 A, 108 S, 108 SC; 24/535; 411/174, 175, 523, 524

[56] References Cited

U.S. PATENT DOCUMENTS

| | | | |
|---|---|---|---|
| 2,171,773 | 9/1939 | Von Mertens | 411/524 |
| 2,306,630 | 12/1942 | Lyon | 301/37 R |
| 2,497,896 | 2/1950 | Lyon | 301/37 CD |
| 2,711,930 | 6/1955 | Lyon | 301/37 CD |
| 3,773,390 | 11/1973 | Foster et al. | 301/37 R |
| 4,243,086 | 1/1981 | Kuttler et al. | 411/523 X |
| 4,457,560 | 7/1984 | Rowe et al. | 301/108 A X |
| 4,505,010 | 3/1985 | Arenhold | 24/535 X |
| 4,606,582 | 8/1986 | Warren | 301/108 S X |

*Primary Examiner*—Robert B. Reeves
*Assistant Examiner*—Russell D. Stormer
*Attorney, Agent, or Firm*—Linval B. Castle

[57] ABSTRACT

An ornamental wheel cover assembly for front and rear wheels of recreation vehicles, trucks, busses or the like includes a hub cover which covers the vehicle hub and has a flange with holes that freely fit over the vehicle lug nuts and a second radial lip having a diameter somewhat larger than the diameter of the central hole in a wheel cover disc. The hub cover is first applied and held in position by the wheel cover disc which is attached to the vehicle wheel by small screws passing through the wheel cover disc to U-shaped clips that attach to the edges of the hand hold openings in the vehicle wheel.

6 Claims, 4 Drawing Figures

VEHICLE WHEEL COVER ASSEMBLY AND ATTACHMENT

BRIEF SUMMARY OF THE INVENTION

This invention relates to ornamental wheel covers for trucks or recreation vehicles, or the like, and in particular to a novel wheel and hub cover assembly which is applied to the vehicle wheel without contacting the wheel lugs.

There are many different designs and attachment methods for mounting ornamental wheel covers to the wheel of trucks and busses. Many types of wheel covers are attached under the hub nuts which connect the wheel to the truck axle. Since this type is considered to be somewhat dangerous and may invalidate a truck drive train warranty, the more recent types of connecting a wheel cover do not require removal or loosening of the wheel lug nuts. For example U.S. Pat. No. 4,240,670, issued Dec. 23, 1980 to Zorn et al, describes a wheel cover which is attached to the chamfered portions of the wheel lug nuts which remain intact in securing the wheel to the axle flange. An example of a wheel cover that does not rely on the wheel lug nuts is described in a Dieterich U.S. Pat. No. 2,722,460, issues Nov. 1, 1955. Here the wheel cover is centrally suspended from wheel openings by adjustable length members hooked between the openings and the wheel cover.

In the design of wheel covers, it is important the mounting method does not include any loosening or removal of wheel lug nuts or any cutting or drilling of the wheel or any other factory installed member or structure that may affect warranties or insurance protection. It is similarly important that the wheel cover, or a center portion thereof, be accessible for removal and tightening of the wheel lug nuts and accessible to the tire valve.

Briefly described, the wheel cover assembly to be described herein includes a hub cover and a coaxial wheel cover disc. The hub cover has an outward flange with spaced holes positioned to fit over and clear the wheel lug nuts. The coaxial wheel cover has a central hole which fits around the hub cover and secures it against the wheel by the peripheral portion of the hub cover flange. The wheel cover is secured to the wheel by clamping it to the edges of the normal oval or circular hand hold openings in the wheel disc between the rim and hub. Thus, the wheel cover assembly is firmly secured to a wheel without the necessity of removal of lug nuts or any cutting, drilling or tapping of the wheel itself.

BRIEF DESCRIPTION OF THE DRAWINGS

In the drawings which illustrate the preferred embodiment of my wheel cover.

DETAILED DESCRIPTION OF THE PREFERRED EMBODIMENT

The wheel and hub cover illustrated herein are designed for use on the front wheels of a recreation vehicle, truck, or bus. It will be appreciated that dual rear wheels may be covered by similarly designed covers having deep drawn wheel covers that substantially follow the contours of the wheel and a deep drawn hub cover that are secured against the hub by the central opening in the wheel cover.

Figure 1:
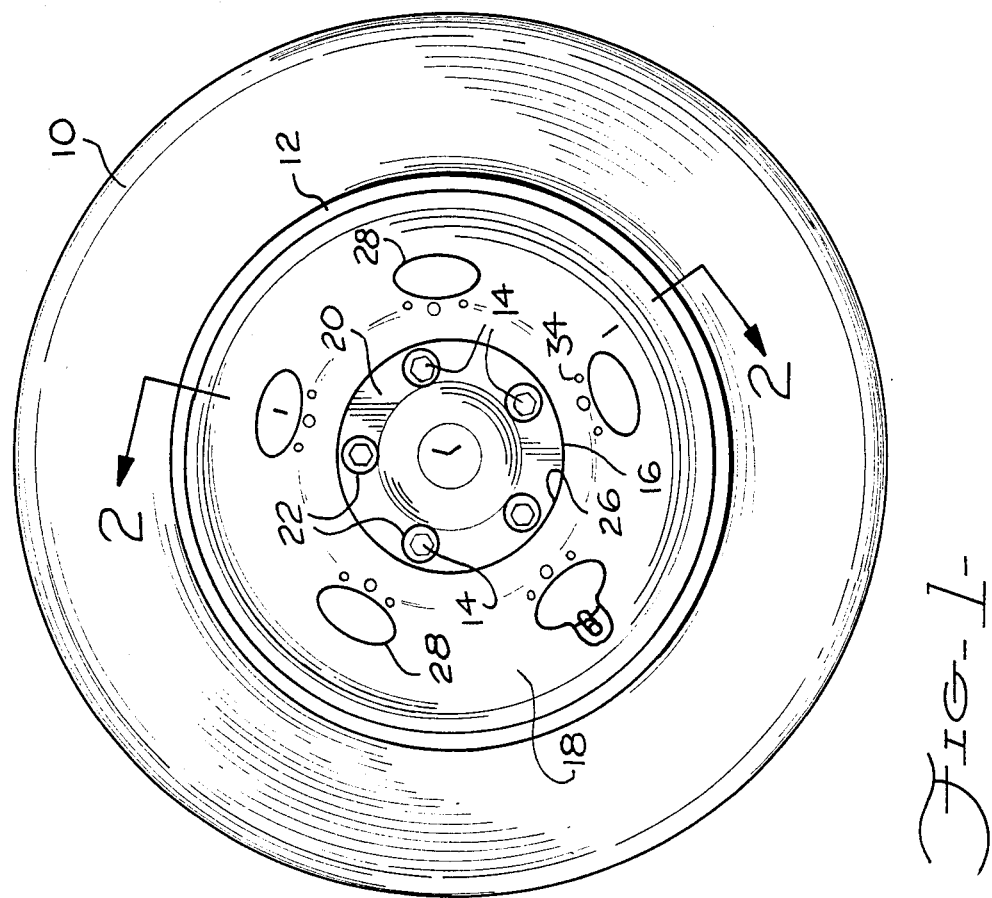
FIG. 1 is a face view of a typical truck wheel with ornamental wheel cover installed thereon.

Illustrated in FIG. 1 but not forming a part of the invention is a typical truck tire 10 mounted to a wheel rim 12, the central hub portion of which is firmly secured to the vehicle axle by suitable lug nuts 14.

Figure 2:
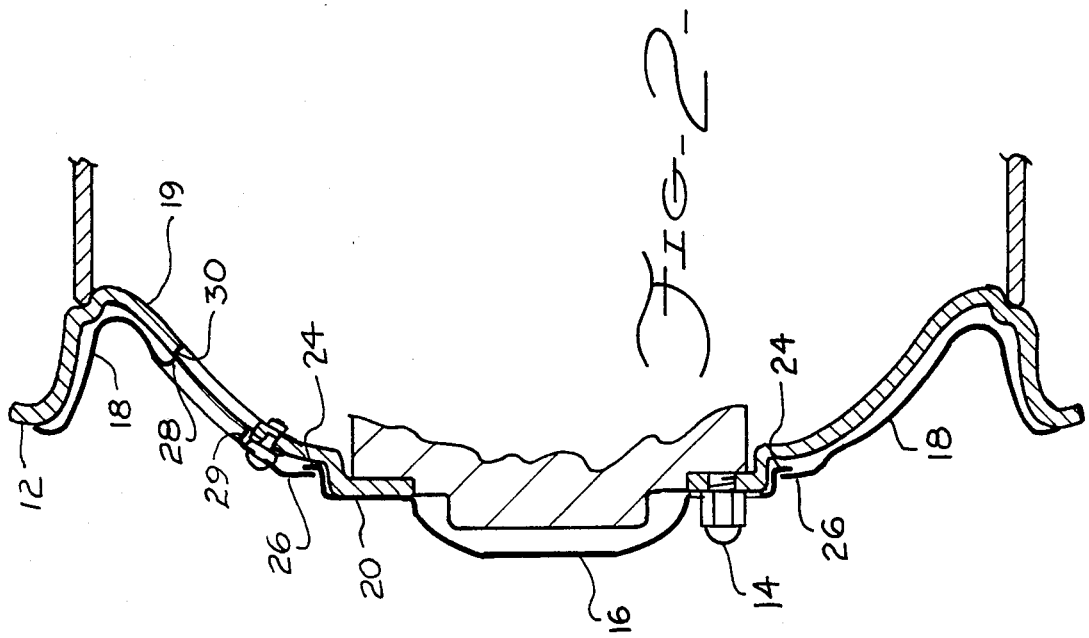
FIG. 2 is a sectional view taken along the lines 2—2 of FIG. 1.

The ornamental wheel cover assembly includes a hub cover 16 and a wheel cover disc 18 which extends from its periphery at the wheel rim 12 and substantially follows the contours of the wheel 19 to the circular hub cover 16 as illustrated in the sectional view of FIG. 2. The hub cover 16 is generally formed so that its interior surface will clear the truck hub and it includes a circular, outward flange 20 which seats against an inner circular lug ring of the truck wheel 19 as shown in FIG. 2. The flange 20 contains a plurality of holes 22 each coaxial with a wheel lug and having a diameter larger than that of the lug nut so that the hub cover 16 may be installed over the truck hub without contacting the lug nuts 14.

As illustrated in FIG. 2, the hub cover flange 20 exterior of the lug nut clearance holes 22 follow the wheel countour and then is turned substantially radially outward to form a lip 24 between the truck wheel disc and the central portion of the wheel cover disc 18 adjacent its central opening. The diameter of the lip 24 is approximately a half inch larger than the diameter of the central hole in the wheel cover disc so that the wheel cover disc 18 functions to retain and secure the hub cover 16 which is the first part of the wheel cover assembly to be installed on a truck wheel.

The wheel cover disc 18 is formed with a plurality of circular or oval holes 28 which are aligned to fit within the hand hold openings 30 in the truck wheel disc 19. Located behind the wheel cover disc and adjacent the inwardly turned edges 29 of each wheel cover hole 28 are means for clamping the wheel cover disc to the truck wheel, as will now be described.

Figure 3:
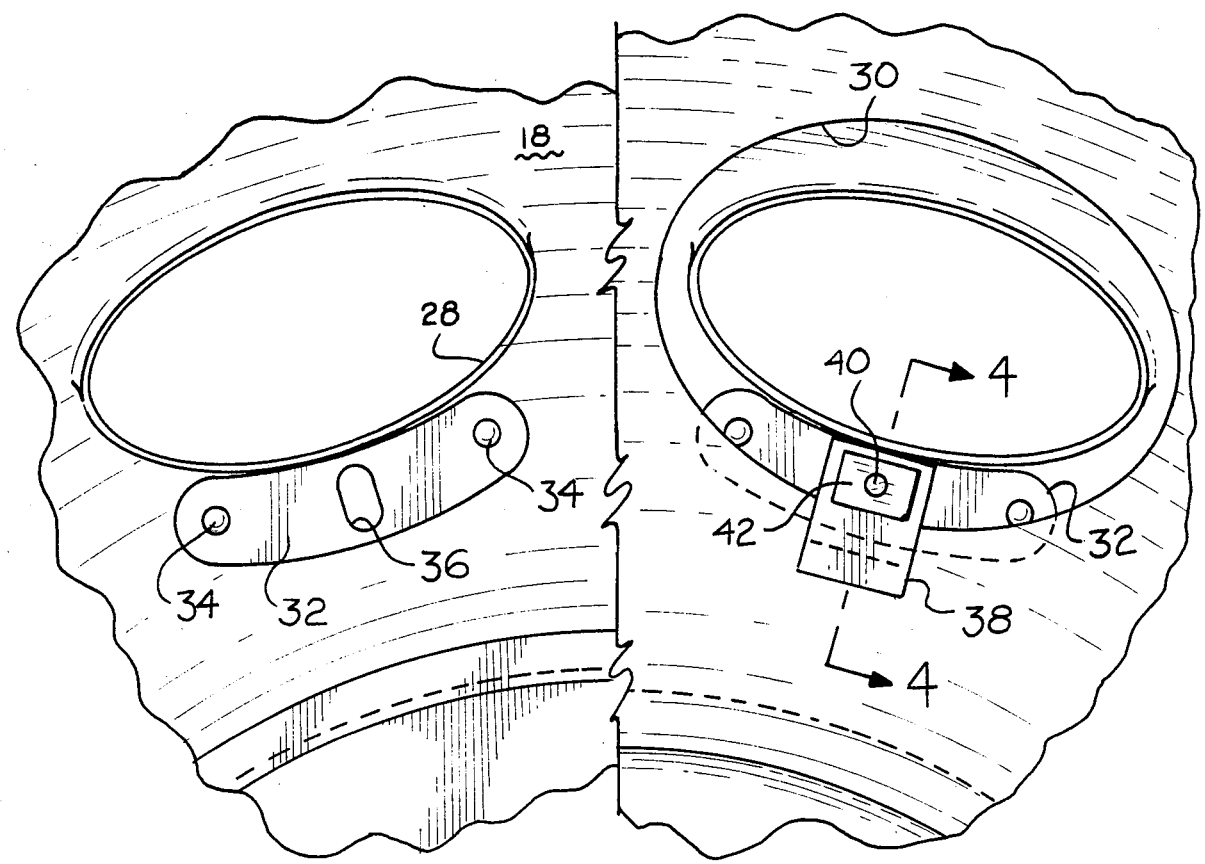
FIG. 3 illustrates, on the left, a rear face view of an opening in the wheel cover disc and, on the right, a rear view of the adjacent wheel cover opening positioned over a hand hold opening in the truck wheel disc.
Figure 4:
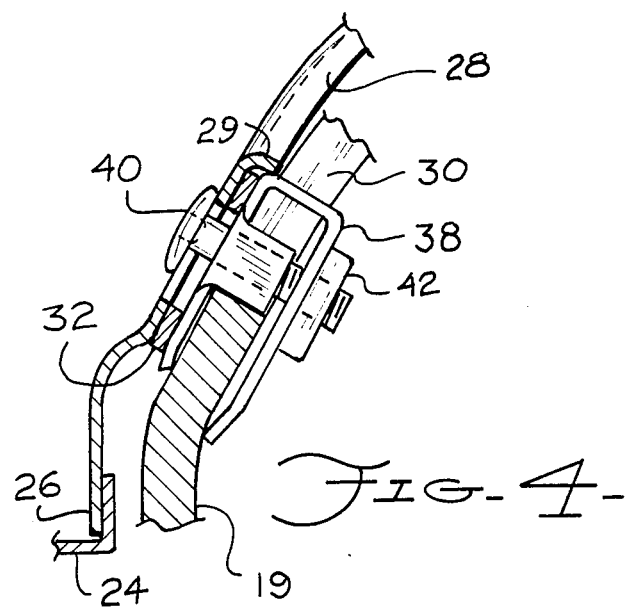
FIG. 4 is a sectional view of the attachment of the wheel cover disc as taken along the lines 4—4 of FIG. 3.

The wheel cover disc 18 which secures the hub cover is, itself, secured to the wheel by U-shaped clips 38 which clamp to the an edge of each hand hold opening in the truck wheel 19 as best illustrated in FIGS. 3 and 4. Positioned on the rear surface of the wheel cover discs 18 and secured by rivets 34 at the location of each clip 38 is a stiffening spacer 32 which functions both to stiffen the relatively thin metal of the wheel cover disc at its clamping point and also provides space between the surfaces of the truck wheel disc 19 and the wheel cover disc 18. Located between the rivets 34 in each spacer 32 is a radially slotted hole 36 extending through to the front face of the wheel cover disc to receive an attachment screw 40 for adjustment of the clamping clip 38 as illustrated in FIG. 3.

FIG. 4 is a sectional view taken along the lines 4—4 of FIG. 3 and illustrates the inner edge 26 of the central opening of the wheel cover disc held against the annular lip of the hub cover, and further shows the wheel cover screw 40 engaging a nut 42 on the U-shaped clip to tighten the strong metal clip 38 which clamps the wheel cover disc to the truck wheel disc 19 at the edge of a hand hold opening 30 in that wheel disc.

Installation of a wheel cover assembly on a truck wheel is quickly and simply accomplished by first placing the hub cover 16 over the wheel hub with the lug holes 22 in the hub cover flange 20 loosely engaging the truck wheel lug nuts 14. The ornamental wheel cover therefore does not contact the lug nuts and the nuts may be removed and wheel removed without affecting the wheel cover. The wheel cover disc 18 is then applied and its central opening, being of a diameter smaller than the outside diameter of the hub cover lip 26, therefore holds the hub cover against the hub. The wheel cover disc 18 is then secured to the truck wheel disc by the tightening of screws 40 that extends from the face of the wheel cover disc through a spacer 32 and to a nut 42 on a clip 42 that firmly engages the edge section of a hand hole opening in the truck wheel disc.

I claim:

1. An ornamental wheel covering for a motor vehicle having wheel discs with a plurality of hand hold openings therein, said wheel discs secured to the wheel hub section of said vehicle by a plurality of wheel lug nuts annularly arranged around the vehicle hub, the wheel covering comprising:
   a hub cover substantially covering the hub section and having a radial flange with a radially extending circular lip;
   a wheel disc cover having an outside diameter substantially equal to the diameter of the vehicle wheel discs and a central circular opening having a diameter smaller than the diameter of said radially extending circular lip for securing said hub cover to said wheel hub; and
   clamping means attached to said wheel cover by a screw for securing said wheel cover to the edge of the hand hold openings in said vehicle wheel disc, the tightening of said screw functioning to tighten the clamping means around the material of said wheel disc.

2. The ornamental wheel covering claimed in claim 1 wherein said hub cover includes a flange for covering the area of said hub section surrounding the wheel lug nuts of the vehicle, said flange having a plurality of clearance holes loosely positioned around and not contacting the lug nuts.

3. The ornamental wheel covering claimed in claim 2 wherein said wheel cover disc contains a plurality of openings between its periphery and said central circular opening, each of said plurality of openings being positioned to correspond to the location of a hand hold opening ins aid vehicle wheel disc, each wheel covering opening having a turned-in edge that fits within the hand hold openings in said vehicle wheel disc.

4. The ornamental wheel covering claimed in claim 3 further including stiffening and spacing members attached to inside surface of said wheel cover disc adjacent each of said plurality of openings therein, said stiffening and spacing members having a central hole aligned with a hole through said wheel cover disc for passing a screw therethrough.

5. The ornamental wheel covering claimed in claim 4 wherein said clamping means includes a U-shaped clip having a threaded member attached thereto for engaging a screw passing through said wheel cover disc and said stiffening and spacing member, the legs of said Ushaped clip engaging the edge of a hand hold opening in said vehicle wheel disc, the tightening of the screw causing the tightening of said U-shaped clip on said hand hold opening edge.

6. The ornamental wheel covering claimed in claim 1 wherein said clamping means includes a clip engaging the edge of a hand hold opening in said vehicle wheel disc, said clip having a threaded member for engaging a screw passing through said wheel cover disc for securing said wheel cover disc to said vehicle wheel disc.

* * * * *